US010830505B2

(12) United States Patent
Rivière et al.

(10) Patent No.: US 10,830,505 B2
(45) Date of Patent: Nov. 10, 2020

(54) THERMOCHEMICAL BOOSTED REFRIGERATION SYSTEM

(71) Applicant: Carrier Corporation, Farmington, CT (US)

(72) Inventors: Cédric Hervé Rivière, Antony (FR); André Georges Stumpf, Bonsecours (FR)

(73) Assignee: Carrier Corporation, Palm Beach Gardens, FL (US)

( * ) Notice: Subject to any disclaimer, the term of this patent is extended or adjusted under 35 U.S.C. 154(b) by 181 days.

(21) Appl. No.: 14/891,495

(22) PCT Filed: Apr. 17, 2014

(86) PCT No.: PCT/US2014/034481
§ 371 (c)(1),
(2) Date: Nov. 16, 2015

(87) PCT Pub. No.: WO2014/189633
PCT Pub. Date: Nov. 27, 2014

(65) Prior Publication Data
US 2016/0101667 A1    Apr. 14, 2016

Related U.S. Application Data

(60) Provisional application No. 61/826,534, filed on May 23, 2013.

(51) Int. Cl.
*F25B 17/08*        (2006.01)
*F25B 25/02*        (2006.01)
(Continued)

(52) U.S. Cl.
CPC ......... *F25B 17/08* (2013.01); *B60H 1/32014* (2019.05); *F25B 25/02* (2013.01);
(Continued)

(58) Field of Classification Search
CPC .. F25B 2400/0417; F25B 25/02; F25B 40/02; F25B 17/08; F25B 27/02; B60H 1/3201; B60H 1/3232
(Continued)

(56) References Cited

U.S. PATENT DOCUMENTS 3,153,441 A    10/1964    Pippert et al.
3,359,752 A *  12/1967    Westling ............ B60H 1/00014
                                                    165/108
(Continued)

FOREIGN PATENT DOCUMENTS

CN    2234879 Y    9/1996
CN    102180080 A  9/2011
(Continued)

OTHER PUBLICATIONS

Translation of DE 10238507 A1.*
International Search Report and Written Opinion for PCT/US2014/034481, dated Aug. 12, 2014.

*Primary Examiner* — Tavia Sullens
(74) *Attorney, Agent, or Firm* — Bachman & LaPointe, P.C.

(57) ABSTRACT

A transport refrigeration system (20) has a compartment (22) and a vapor compression refrigeration system (30). The vapor compression refrigeration system (30) has: a compressor (32); a first heat exchanger (34) downstream of the compressor along a refrigerant flowpath in a cooling mode; an expansion device (36); a second heat exchanger (38) downstream of the expansion device along the refrigerant flowpath; and a fan (42) for driving air along an air flowpath across the second heat exchanger for cooling the compartment in the cooling mode. A thermochemical refrigeration system (100) is coupled to the vapor compression refrigeration system downstream of the first heat exchanger and (Continued)

upstream of the second heat exchanger along the refrigerant flowpath in the cooling mode.

19 Claims, 4 Drawing Sheets

(51) Int. Cl.
    *B60H 1/32*     (2006.01)
    *F25B 27/02*     (2006.01)
    *F25B 40/02*     (2006.01)

(52) U.S. Cl.
    CPC .............. *F25B 27/02* (2013.01); *F25B 40/02* (2013.01); *Y02A 30/27* (2018.01); *Y02B 30/62* (2013.01)

(58) Field of Classification Search
    USPC .......................................................... 62/115
    See application file for complete search history.

(56) References Cited

U.S. PATENT DOCUMENTS

| | | | | |
|---|---|---|---|---|
| 3,824,804 | A * | 7/1974 | Sandmark | F25B 25/02 62/238.3 |
| 3,953,983 | A * | 5/1976 | Sander | F25B 25/02 62/79 |
| 4,345,440 | A | 8/1982 | Allen et al. | |
| 5,163,302 | A * | 11/1992 | Swadner | B60H 1/3201 62/244 |
| 5,628,205 | A | 5/1997 | Rockenfeller et al. | |
| 6,708,511 | B2 * | 3/2004 | Martin | F25B 29/003 62/201 |
| 6,807,820 | B2 * | 10/2004 | Aikawa | B60H 1/00492 62/238.3 |
| 7,037,360 | B2 * | 5/2006 | Inagaki | F25B 25/02 96/126 |
| 8,250,874 | B2 * | 8/2012 | Ikegami | B60H 1/00335 165/100 |
| 9,709,302 | B2 * | 7/2017 | Martin | F25B 7/00 |
| 2005/0011209 | A1 * | 1/2005 | Sawada | F25B 25/02 62/228.3 |
| 2006/0156761 | A1 * | 7/2006 | Mola | B60H 1/3201 65/333 |

FOREIGN PATENT DOCUMENTS

| | | | | |
|---|---|---|---|---|
| CN | 202038141 U | 11/2011 | | |
| DE | 10233762 A1 | 2/2003 | | |
| DE | 10238507 A1 * | 4/2003 | ............. | F25B 17/08 |
| FR | 2809103 A1 | 11/2001 | | |
| GB | 1392423 A | 4/1975 | | |
| GB | 2464121 A | 4/2010 | | |
| JP | 2000-88393 A | 3/2000 | | |
| JP | 2000198347 A | 7/2000 | | |
| WO | 93/02328 A1 | 2/1993 | | |
| WO | 94/06645 A1 | 3/1994 | | |
| WO | 2006/135871 A2 | 12/2006 | | |
| WO | 2008/142358 A1 | 11/2008 | | |
| WO | 2009/100501 A1 | 8/2009 | | |
| WO | 2010/088978 A1 | 8/2010 | | |

* cited by examiner

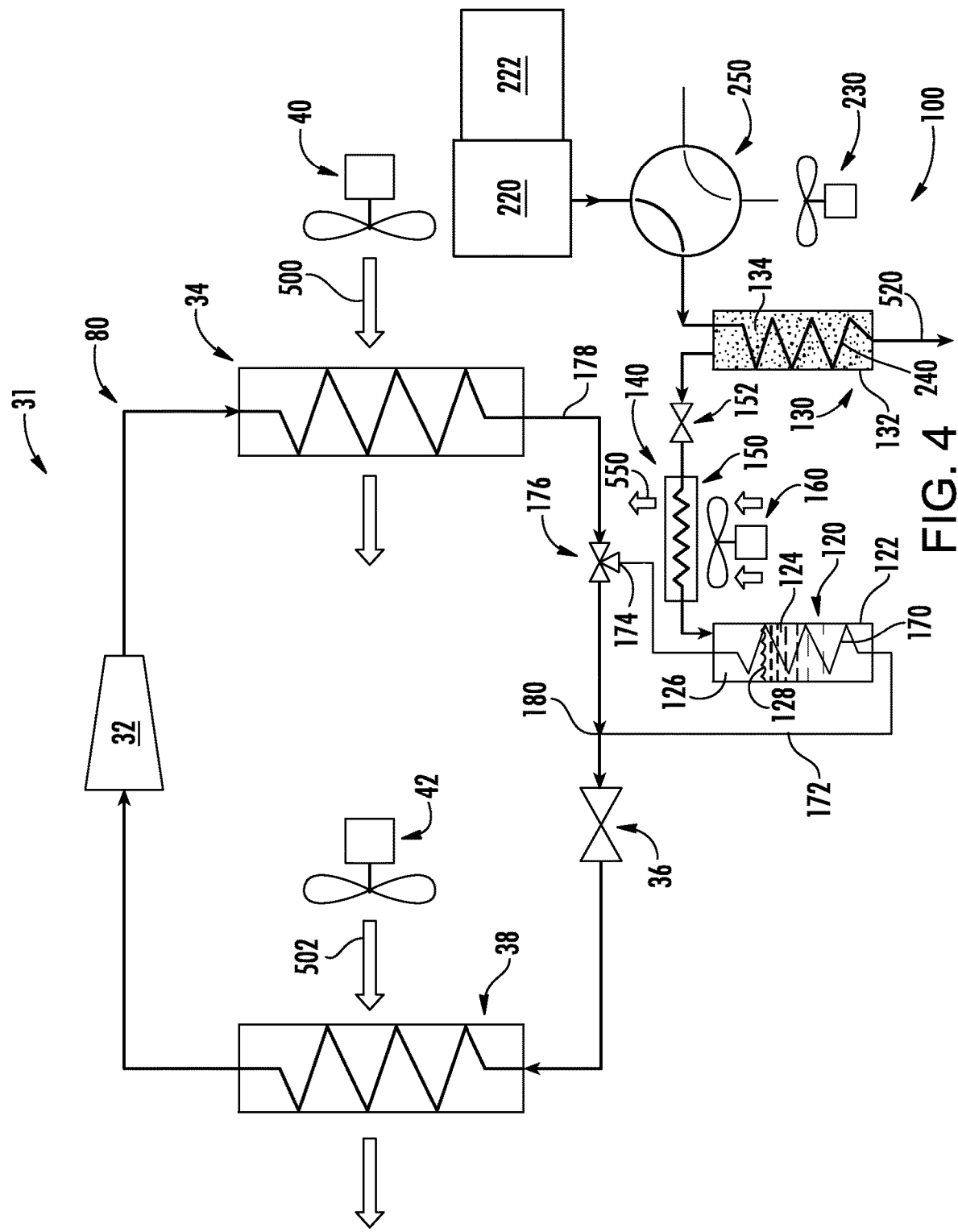

THERMOCHEMICAL BOOSTED REFRIGERATION SYSTEM

CROSS-REFERENCE TO RELATED APPLICATION

Benefit is claimed of U.S. Patent Application Ser. No. 61/826,534, filed May 23, 2013, and entitled "Thermochemical Boosted Refrigeration System", the disclosure of which is incorporated by reference herein in its entirety as if set forth at length.

BACKGROUND

The disclosure relates to refrigeration. More particularly, the disclosure relates to transport refrigeration systems.

Transport refrigeration systems include cargo/shipping containers, trailers, and trucks. Each system involves one or more refrigerated compartments and a refrigeration system positioned to cool a recirculating airflow within the compartment. Depending upon the implementation, refrigeration equipment may be mounted to an exterior of the container or within a subcompartment in the container.

Many truck and trailer configurations mount the equipment to the front of the container, often high on the front wall so that the outlet for discharging cooled air into the compartment is near the compartment ceiling. For a vapor compression refrigeration cycle, the equipment typically includes: an electrically-powered compressor; a heat rejection heat exchanger; an expansion device; and a heat absorption heat exchanger. An internal combustion engine (ICE) generator may also be provided to power the compressor.

Two competing considerations have long strained the industry. First, efficiency has long been a major concern. Second, concerns about particular refrigerants have led to use of refrigerants which may have less than optimal efficiency.

Separately, thermochemical refrigeration systems have been proposed. These generally operate in an intermittent fashion. The process is based on liquid thermochemical refrigerant (e.g., ammonia) evaporation to a gas which reacts with a medium (e.g., reactive salts). The system has three main elements; an evaporator containing liquid ammonia; a valve; and a reactor containing the reactive salts. These operate in two stages: stage one being a refrigeration stage; and stage two being a recharging or regeneration stage.

In stage one, there initially is a liquid ammonia accumulation in the evaporator. Upon opening the valve, the ammonia contained in the evaporator evaporates. The evaporation absorbs heat to provide a refrigeration effect. The evaporator may form a heat exchanger which absorbs heat in this stage. The gaseous ammonia flows to the reactor where it is fixed by the solid salts contained in the reactor. This absorption reaction in the reactor produces heat which may be rejected. Thus, the reactor may form a second heat exchanger. The evaporation temperature can reach an exemplary −30° C. and the absorption temperature an exemplary more than 100° C.

The second stage is a recharge. Once the ammonia stored is fully or partially exhausted, the system is recharged. At the beginning of stage two, the reactor contains the solid in which the ammonia has been absorbed. Heating in the reactor may cause desorption of the ammonia. The gaseous ammonia which will condense in the evaporator.

SUMMARY

One aspect of the disclosure involves a transport refrigeration system having a compartment and a vapor compression refrigeration system. The vapor compression refrigeration system has: a compressor; a first heat exchanger downstream of the compressor along a refrigerant flowpath in a cooling mode; an expansion device; a second heat exchanger downstream of the expansion device along the refrigerant flowpath; and a fan for driving air along an air flowpath across the second heat exchanger for cooling the compartment in the cooling mode. A thermochemical refrigeration system is coupled to the vapor compression refrigeration system downstream of the first heat exchanger and upstream of the second heat exchanger along the refrigerant flowpath in the cooling mode.

In one or more embodiments of any of the foregoing embodiments, the thermochemical refrigeration system comprises: a reactor; an evaporator; and a valve arranged along a thermochemical refrigerant flowpath between the reactor and the evaporator.

In one or more embodiments of any of the foregoing embodiments, an additional heat exchanger is positioned between the reactor and the evaporator.

In one or more embodiments of any of the foregoing embodiments, the additional heat exchanger may be a refrigerant-air heat exchanger.

In one or more embodiments of any of the foregoing embodiments, a valve is operable between: a first condition where refrigerant from the vapor compression system passes through the evaporator; and a second condition where refrigerant from the vapor compression system bypasses the evaporator.

In one or more embodiments of any of the foregoing embodiments, the switching valve may be located between the first heat exchanger and the expansion device; and a return line from the thermochemical refrigeration system is located between the switching valve and the second heat exchanger.

In one or more embodiments of any of the foregoing embodiments, the system is one of: a refrigerated trailer; a refrigerated truck cargo box; and a refrigerated shipping container.

In one or more embodiments of any of the foregoing embodiments, the compartment is formed by a container having a door opening with at least one door.

In one or more embodiments of any of the foregoing embodiments, the system includes a heat source for delivering heat to the reactor.

In one or more embodiments of any of the foregoing embodiments, the heat source is an internal combustion engine.

In one or more embodiments of any of the foregoing embodiments, a controller is configured to operate the system in a first said cooling mode wherein: refrigerant is compressed in the compressor and passed to the first heat exchanger; the refrigerant is cooled in the first heat exchanger; the refrigerant cooled by the first heat exchanger is further cooled by the thermochemical refrigeration system; the refrigerant further cooled by the thermochemical refrigeration system is expanded by the expansion device; and the expanded refrigerant is heated in the second heat exchanger and returned to the compressor.

In one or more embodiments of any of the foregoing embodiments, the system is operated in a first said cooling mode wherein: refrigerant is compressed in the compressor and passed to the first heat exchanger; the refrigerant is cooled in the first heat exchanger; the refrigerant cooled by the first heat exchanger is further cooled by the thermochemical refrigeration system; the refrigerant further cooled by the thermochemical refrigeration system is expanded by the expansion device; and the expanded refrigerant is heated in the second heat exchanger and returned to the compressor.

In one or more embodiments of any of the foregoing embodiments, the system may be operated in a second said cooling mode wherein: refrigerant is compressed in the compressor and passed to the first heat exchanger; the refrigerant is cooled in the first heat exchanger; the refrigerant cooled by the first heat exchanger bypasses the thermochemical refrigeration system and is expanded by the expansion device; and the expanded refrigerant is heated in the second heat exchanger and returned to the compressor.

In one or more embodiments of any of the foregoing embodiments, in a first sub-mode of the second said cooling mode, the thermochemical refrigeration system receives heat from an internal combustion engine to desorb a thermochemical refrigerant from a storage medium.

In one or more embodiments of any of the foregoing embodiments, in a second sub-mode of the said second cooling mode, the thermochemical refrigeration system does not receive heat from the internal combustion engine to desorb the thermochemical refrigerant from the storage medium.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 4 is a schematic view of the hybrid refrigeration system of the system of FIG. 1 in a recharge mode.

Like reference numbers and designations in the various drawings indicate like elements.

DETAILED DESCRIPTION

Figure 1:
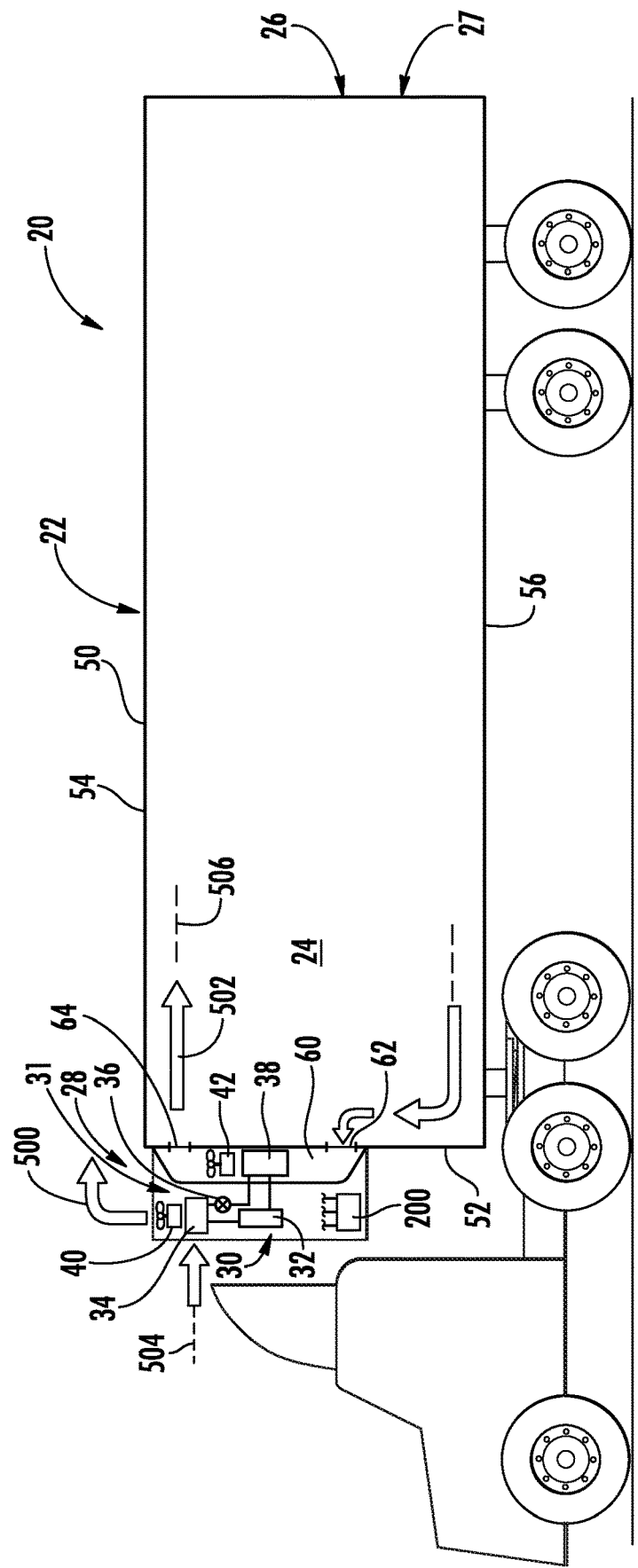
FIG. 1 is a simplified side schematic view of a transport refrigeration system.

FIG. 1 shows a refrigerated transport system in the form of a trailer 20 having a compartment or container in the form of box 22 with an interior 24. In the exemplary box 22, at least one door (e.g., a roll-up door or a pair of side hinge doors) 26 is positioned at a doorway 27 formed at a rear of the box 22. An equipment compartment (equipment box) 28 is located along a front of the box 22 and contains a refrigeration system 30.

The refrigeration system 30 includes a vapor compression system 31 comprising a compressor 32. Sequentially downstream of the compressor 32, along the refrigerant flowpath, are a heat rejection heat exchanger 34 (e.g., condenser or gas cooler), an expansion device 36 (e.g., electronic expansion valve (EEV)), and a heat absorption heat exchanger (evaporator) 38 connected via an appropriate refrigerant line. In one embodiment, the heat exchangers 34, 38 are refrigerant-air heat exchangers and may have associated fans 40, 42 configured to generate an air flow across each heat exchanger 34, 38 respectively. The air flow generated by fan 40 across the condenser 34 is shown at 500 and the air flow generated by fan 42 across the evaporator 38 is indicated at 502. Flows 500 and 502 pass along respective flowpaths 504 and 506. In various implementations, the equipment box 28 may also contain a power source (not shown), such as an internal combustion engine driving an electric generator for example, which may in turn, power the compressor 32 and fan(s) 40, 42. Alternative implementations may use vehicle electric power to power the vapor compression system 31.

An exemplary box 22 is formed of an insulated wall structure 50 on the front 52, top 54, bottom 56, and left and right sides with the door(s) 26 also being insulated. The exemplary wall structure 50 has at least one opening associated with the refrigeration system 30. In the illustrated, non-limiting embodiment, a rear portion of the equipment box 28 is generally aligned with an aperture of the front wall of wall structure 50. The equipment box 28 defines a duct 60 extending from a first port (an inlet) 62 low along an aft wall of the box 28 to a second port (an outlet) 64 high along the aft wall. Within the duct 60, along an air flowpath are the evaporator 38 and its associated fan 42. The refrigeration transportation system 20 described herein is provided for illustrative purposes, and systems 20 having other configurations, such as those known to a person having ordinary skill in the art for example, are within the scope of the invention.

Figure 2:
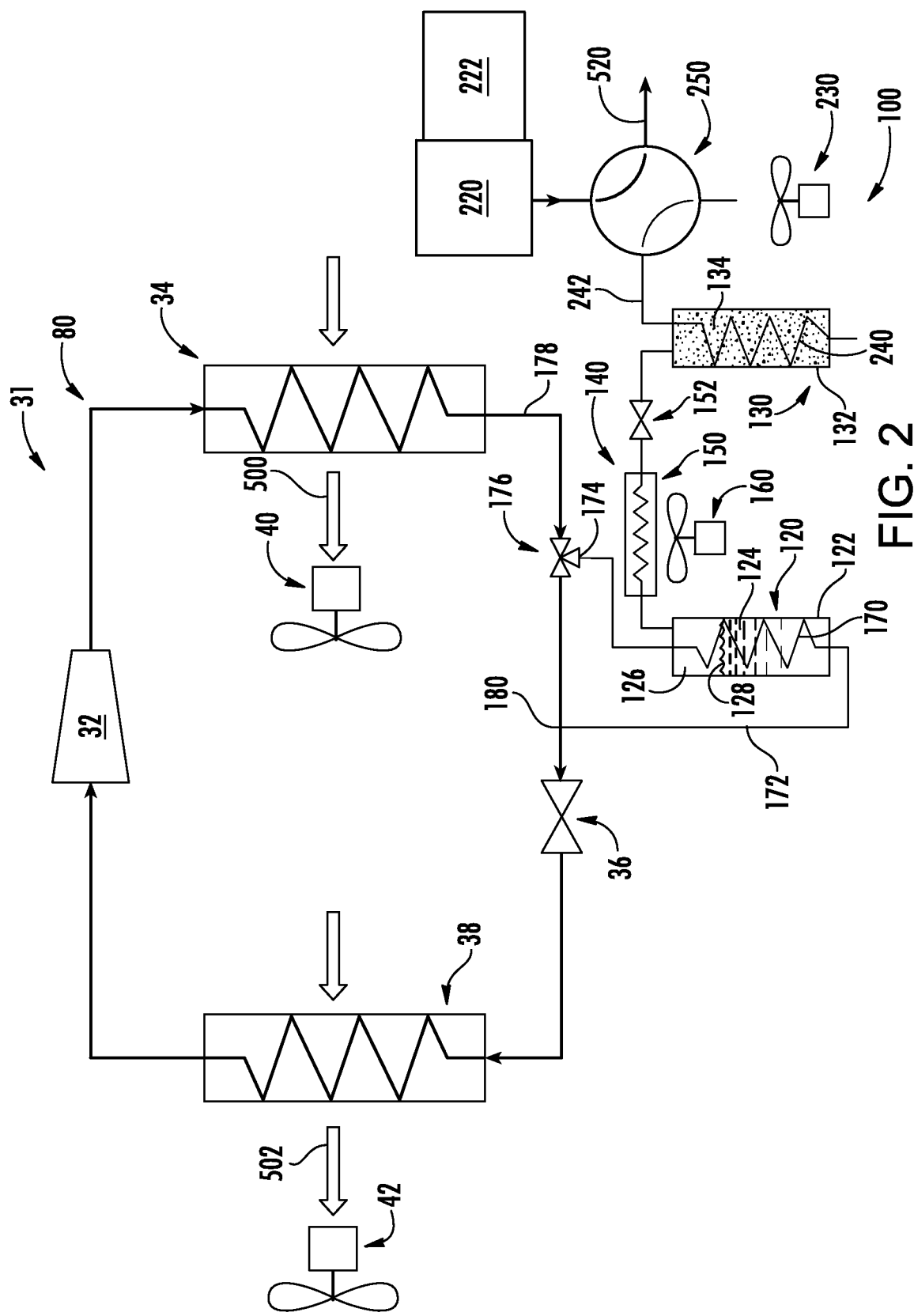
FIG. 2 is a schematic view of a hybrid refrigeration system of the system of FIG. 1 in a first cooling mode.
Figure 3:
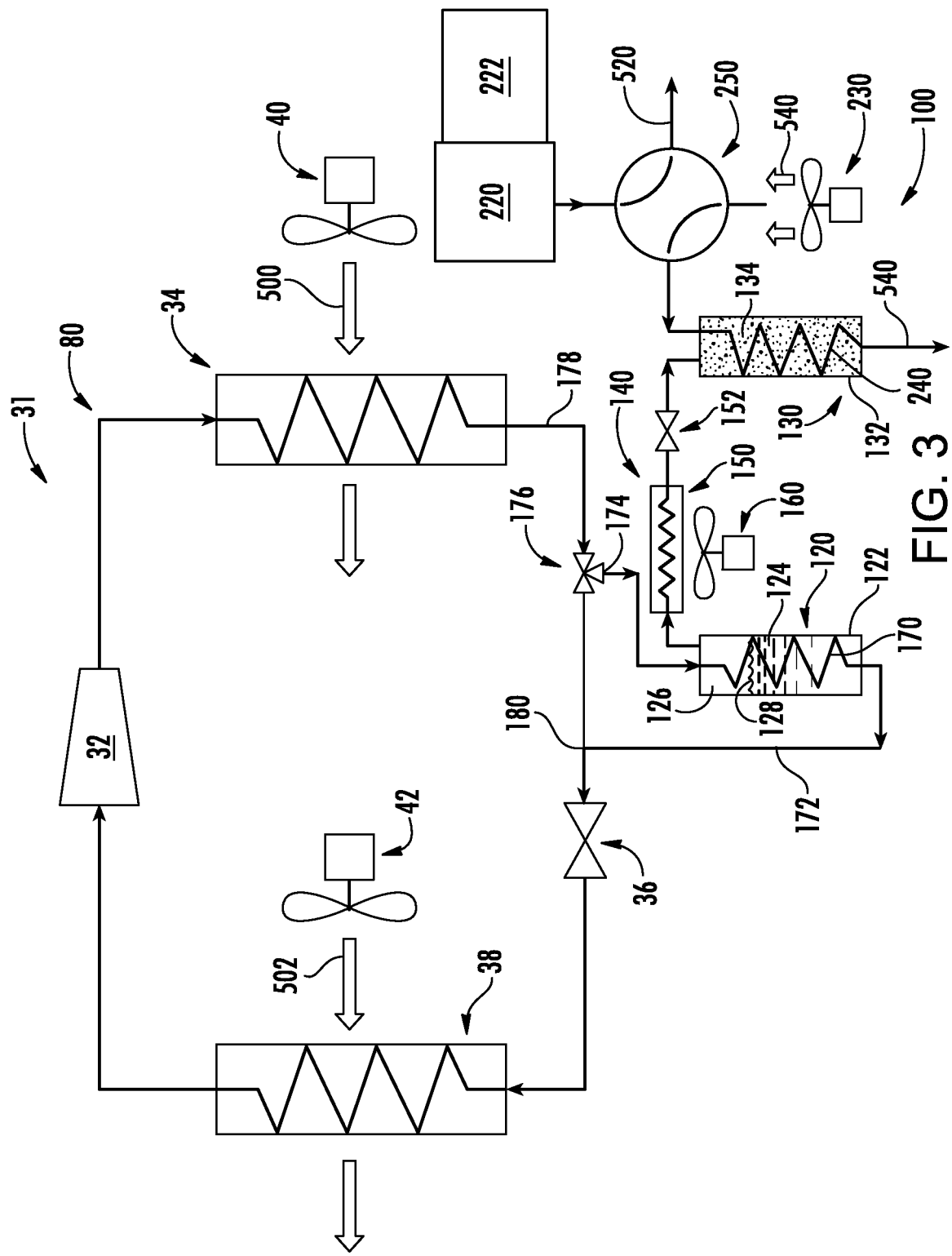
FIG. 3 is a schematic view of the hybrid refrigeration system of the system of FIG. 1 in a boost mode.

FIGS. 2-4 illustrate a thermochemical booster system 100 configured to interface with the vapor compression system 31. In the schematic views of FIGS. 2-4, flow direction arrows are included along various fluid-carrying lines. Additionally, thickened lines are used to illustrate the carriage of fluid, whereas thin lines illustrate lines that may not be carrying active flows. Referring now to FIG. 2, the refrigeration system 30 is illustrated in a normal cooling mode wherein the vapor compression system 31 is operational and the booster system 100 is non-operational. As discussed previously, in the normal cooling mode, the refrigerant flowpath 80 passes sequentially from the compressor outlet to the condenser 34, to the expansion device 36, to the evaporator 38, and returning to the compressor inlet. The thermochemical booster system 100 is operably coupled to the main refrigerant flowpath 80 between the condenser 34 and the expansion device 36. The thermochemical booster system 100 comprises several main components. A first component of the booster system 100 is an evaporator 120 having a tank or vessel 122. The tank 122 may contain a thermochemical refrigerant (e.g., ammonia). The thermochemical refrigerant may be in the form of a liquid accumulation 124 in a lower portion of the vessel and gas 126 in an upper portion or headspace of the vessel 122 above a surface 128 of the liquid. The second component is a reactor 130 comprising a tank or vessel 132. The interior of the vessel 132 contains a medium 134, such as a salt as described above for example. A flowpath 140 is provided between the evaporator vessel 122 and reactor vessel 132. Depending upon the mode, the flowpath 140 is configured to convey the thermochemical refrigerant in one direction or the other. Along the flowpath 140, the system 100 may include a heat exchanger 150 and a valve 152. In one embodiment, the heat exchanger 150 is a refrigerant-air heat exchanger arranged in communication with an airflow driven by an adjacent fan 160.

The booster system 100 may be thermally coupled with the vapor compression system 31, such as with a heat exchanger 170 integrated with the evaporator 120 for example. The heat exchanger 170 may be configured to bypass a flow of refrigerant from the vapor compression system 31 into the evaporator 120 such that the refrigerant and the thermochemical refrigerant thermally communicate. A bypass line 172 has two ports arranged along the vapor compression system flowpath 80. One or both of these ports may be governed by a valve. In the illustrated, non-limiting embodiment, an inlet port 174 of the line 172 is connected to a valve 176 positioned within a refrigerant line 178 extending between the condenser 34 and the expansion device 36 of the vapor compression system 31. Bypass line 172 has a second port (e.g., an outlet) 180 connected to the line 178 downstream of the port 174 (e.g., between the valve 176 and the expansion device 36). As is discussed further below, diversion of refrigerant flow from the vapor compression system 31 through the heat exchanger 170 will be provided by operating the valve 176 to allow refrigerant from the condenser 34 to flow into bypass line 172. In the normal cooling mode illustrated in FIG. 2, there is no refrigerant flow through the heat exchanger 170.

Means may also be provided for selectively adding heat to the reactor 130 and optionally withdrawing heat therefrom. Heat may be provided from a heat source 220. In one embodiment, the heat source 220 is the aforementioned internal combustion engine driving a generator 222 to power the rest of the refrigeration system 30. Alternative heat sources may include, but are not limited to, the vehicle propulsion engine or an electric or other heater (e.g., particularly in the case of electric or hybrid vehicles).

In embodiments including a cooling means, an exemplary cooling means comprises a fan 230 for driving an airflow (e.g., an ambient external airflow). To deliver or withdraw the heat, a heat exchanger 240 may be integrated with the reactor 130. In one embodiment, the heat exchanger 240 is formed by a conduit 242 configured to convey either exhaust from the engine 220 or ambient air from the fan 230 in thermal communication with the medium 134 and refrigerant therein. FIG. 2 further shows a switching valve 250 for switching between the two.

FIG. 3 shows operation of the thermochemical booster system 100 in a boost mode wherein the valve 176 diverts refrigerant into the line 172 and heat exchanger 170 to reject heat to the thermochemical liquid refrigerant 124 in the evaporator. With the illustrated operational condition of the vapor compression system 31, this may be viewed as a boost sub-mode of a cooling mode of the vapor compression system 31. As is discussed further below, various modes of operation of the thermochemical booster system 100 may be combined with various modes of operation of the vapor compression system 31 in ways other than illustrated.

In FIG. 3, the resulting cooled refrigerant returns to the flowpath 80 at the port 180 and passes through the expansion device 36 to deliver cooler refrigerant to the evaporator 38 than would be available in the normal cooling mode illustrated in FIG. 2. In the boost mode, the valve 152 is open, thereby allowing the thermochemical refrigerant to pass from the evaporator 120 to the reactor 130. Flow along the flowpath 140 is driven by the pressure of the thermochemical refrigerant gas 126 evaporated from liquid 124 by the heat transfer from the heat exchanger 170. The refrigerant vapor passes through to the reactor 130 where it is absorbed by the media therein. Removal of heat from the reactor 130, as discussed above, is via an airflow 540 driven by the fan 230 and passed through the heat exchanger 240. Boost mode operation may continue until it is no longer needed or until evaporator liquid refrigerant 124 has been depleted.

A third operational mode (or sub-modes(s)) of the thermochemical booster system 100 is a regeneration mode (see FIG. 4). The regeneration mode serves to return the thermochemical refrigerant from the reactor 130 to the evaporator 120. To drive this return, heat is applied to the medium 134 in reactor 130 to desorb the thermochemical refrigerant, increase pressure and drive thermochemical refrigerant vapor along the flowpath 140, back to the evaporator 120. To introduce the heat, the heat source 220 is used. In the illustrated non-limiting implementation, this involves actuating the valve 250 to pass the exhaust flow 520 through the heat exchanger 240 where it heats the medium and thermochemical refrigerant in the reactor 130. The thermochemical refrigerant vapor passes through the open valve 152 to the evaporator 120. To withdraw heat from the refrigerant, it may be possible to use the heat exchanger 170 and/or the heat exchanger 150 (if present). In the exemplary implementation, this is performed only by the heat exchanger 150. Refrigerant flow through the heat exchanger 170 is shut off via the valve 176 as in the FIG. 2 mode. To cool the thermochemical refrigerant in the heat exchanger 150, the exemplary fan 160 may drive an airflow 550 across the heat exchanger 150, thereby cooling and condensing the thermochemical refrigerant before it reaches the evaporator. When the evaporator 120 is fully recharged or if a return to the boost mode is needed, the regeneration mode may be terminated by a controller 200 (FIG. 1).

Although three basic operational modes of the thermochemical booster system 100 are discussed, additional modes (e.g., including transitional modes) may be possible. For example, after termination of the regeneration mode, there may be a reactor cooling mode within the off mode (no interaction within the vapor compression system) wherein the fan 230 cools the reactor 130 in advance of anticipated boost mode operation.

The vapor compression system 31 may operate in several exemplary basic modes. Basic cooling mode is discussed above wherein refrigerant is compressed, heat rejected in the condenser, refrigerant expanded in the expansion device, and heat absorbed in the evaporator. In a basic heating mode, the flow direction may be reversed so that heat is rejected in what had been the evaporator. Reversal may be achieved via reversing the direction of driving of the compressor or via switching valves which maintains flow direction within the compressor but reverses flow direction outside the compressor.

These two basic modes may be used to create additional functional modes. One example of a normal operational mode seeking to maintain the compartment at a set temperature below ambient temperature involves a start-stop cooling mode wherein the system cycles between a cooling mode and an off condition. The system 31 may operate until a certain threshold compartment temperature is achieved whereupon the system 31 is shut off and the compartment temperature is allowed to rise until it reaches a second threshold whereupon cooling resumes.

An alternative normal operational mode involves continuous running of the system but, upon reaching the first threshold, the heating mode is engaged until the temperature increases to the second threshold whereupon cooling mode is resumed. This continuous compressor operation mode may provide enhanced defrosting during the heating intervals.

An alternative defrosting mode involves simply shutting off the vapor compression system when frost buildup is detected.

An exemplary pull-down mode is performed to cool the compartment as quickly as possible (e.g., when the system is first started or cooling need is high (e.g., if compartment temperature is above yet a higher threshold than the aforementioned second threshold)). Pull-down may involve operating the compressor at a higher—than-normal speed, sacrificing efficiency for quick cooling. Upon reaching a threshold, such as the aforementioned first threshold for example, the system may switch over to one of the normal refrigeration modes (start-stop or continuous).

In circumstances where it is desired to maintain the compartment at a temperature above ambient, start-stop and continuous compressor operational heating modes may be possible, similar to the corresponding refrigeration modes.

The controller may be programmed or otherwise configured to engage the boost mode under any of several conditions. One general condition is when measured temperature (e.g., a return air temperature) exceeds a desired temperature (e.g., an entered setpoint) by more than a threshold amount. Thus, the controller may coordinate vapor compression system operating modes with boost system operational modes. In the example above, boost may be started upon starting of the pull-down mode (either simultaneously with vapor compression system pull-down mode or while running the compressor at a more efficient speed). Regeneration may occur during the other modes of the vapor compression system.

The controller may also switch between modes of the thermochemical booster system 100 in response to available heat. At typical start-up conditions, there is a correlation between heat availability (more particularly, the unavailability) and the cooling requirement. For several minutes after start-up, an internal combustion engine as the heat source may remain insufficient to provide any regeneration. Accordingly, this provides a good opportunity to operate in boost mode. Coincidentally, this will be typically associated with pull-down conditions making boost mode desirable.

The use of "first", "second", and the like in the following claims is for differentiation only and does not necessarily indicate relative or absolute importance or temporal order. Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A method for operating a transport refrigeration system (20), the system comprising:
    a compartment (22); and
    a vapor compression refrigeration system (30) including:
        a compressor (32);
        a first heat exchanger (34) downstream of the compressor along a refrigerant flowpath in at least one cooling mode;
        an expansion device (36);
        a second heat exchanger (38) downstream of the expansion device along the refrigerant flowpath; and
        a fan (42) for driving air along an air flowpath across the second heat exchanger for cooling the compartment in the at least one cooling mode,
    further comprising:
        a thermochemical refrigeration system (100) coupled to the vapor compression refrigeration system by a bypass line (172), said bypass line coupled to the vapor compression refrigeration system at two separate points downstream of the first heat exchanger and upstream of the second heat exchanger along the refrigerant flowpath in the at least one cooling mode, the thermochemical refrigeration system comprising a refrigerant-air heat exchanger (150) positioned along a single conduit extending between a reactor and an evaporator to provide alternate flow in one of two directions depending on mode through the single conduit between the evaporator and the reactor so that a thermochemical refrigerant flowpath is a single bidirectional flowpath,
    the method comprising:
        operating in a first said cooling mode wherein:
            refrigerant is compressed in the compressor and passed to the first heat exchanger;
            the refrigerant is cooled in the first heat exchanger;
            the refrigerant cooled by the first heat exchanger is further cooled by the thermochemical refrigeration system;
            the refrigerant further cooled by the thermochemical refrigeration system is expanded by the expansion device; and
            the expanded refrigerant is heated in the second heat exchanger and returned to the compressor; and
        operating in a second said cooling mode wherein:
            refrigerant is compressed in the compressor and passed to the first heat exchanger;
            the refrigerant is cooled in the first heat exchanger;
            the refrigerant cooled by the first heat exchanger bypasses the thermochemical refrigeration system and is expanded by the expansion device; and
            the expanded refrigerant is heated in the second heat exchanger and returned to the compressor.

2. The method of claim 1, wherein:
    in the first said cooling mode, said further cooling of the refrigerant by the thermochemical refrigeration system comprises:
        transferring heat to the thermochemical refrigerant in the evaporator to vaporize the thermochemical refrigerant, the vaporization driving the vapor to the reactor.

3. The method of claim 1 wherein:
    in a first sub-mode of the second said cooling mode, the thermochemical refrigeration system receives heat from an internal combustion engine to desorb a thermochemical refrigerant from a storage medium.

4. The method of claim 3 wherein:
    in a second sub-mode of the said second cooling mode, the thermochemical refrigeration system does not receive heat from the internal combustion engine to desorb the thermochemical refrigerant from the storage medium.

5. The method of claim 3, wherein:
    in the first said cooling mode, said further cooling of the refrigerant by the thermochemical refrigeration system comprises:
        transferring heat to the thermochemical refrigerant in the evaporator to vaporize the thermochemical refrigerant;
        passing thermochemical refrigerant vapor through a single conduit from the evaporator to the reactor containing the storage medium; and
        absorbing the vapor in the storage medium in the reactor; and
    in the first sub-mode of said second cooling mode, the desorbed thermochemical refrigerant passes as a vapor through the same said single conduit to the evaporator in an opposite direction to the passing in the first said cooling mode.

6. A transport refrigeration system (20) comprising:
    a compartment (22); and
    a vapor compression refrigeration system (30) including:
        a compressor (32);

a first heat exchanger (34) downstream of the compressor along a refrigerant flowpath in a cooling mode;
an expansion device (36);
a second heat exchanger (38) downstream of the expansion device along the refrigerant flowpath; and
a fan (42) for driving air along an air flowpath across the second heat exchanger for cooling the compartment in the cooling mode, further comprising:
a thermochemical refrigeration system (100) coupled to the vapor compression refrigeration system by a bypass line (172), said bypass line coupled to the vapor compression refrigeration system at two separate points downstream of the first heat exchanger and upstream of the second heat exchanger along the refrigerant flowpath in the cooling mode and the thermochemical refrigeration system comprising:
an evaporator 120);
a reactor (130); and
a refrigerant-air heat exchanger (150) positioned along a single conduit extending between the reactor and the evaporator to provide alternate flow in one of two directions depending on mode through the single conduit between the evaporator and the reactor so that a thermochemical refrigerant flowpath is a single bidirectional flowpath; and
a heat source (220) for delivering heat to the reactor, the heat source being an internal combustion engine.

7. The transport refrigeration system of claim 6, further comprising:
a switching valve (250) coupled to the heat source to selectively:
couple the heat source to the reactor for said delivering of heat; and
couple an ambient air flow (540) to the reactor to remove heat from the reactor.

8. The transport refrigeration system of claim 6, wherein the thermochemical refrigeration system comprises a thermochemical refrigerant comprising ammonia; and
the reactor comprises a vessel and a salt medium in the vessel.

9. The transport refrigeration system of claim 6, wherein:
the evaporator (120) couples the thermochemical refrigeration system to the vapor compression refrigeration system.

10. The transport refrigeration system of claim 9 wherein the evaporator is a refrigerant-refrigerant heat exchanger for exchanging heat between a refrigerant of the vapor compression refrigeration system and a refrigerant of the thermochemical refrigeration system.

11. A transport refrigeration system (20) comprising:
a compartment (22); and
a vapor compression refrigeration system (30) including:
a compressor (32) for compressing a refrigerant;
a first heat exchanger (34) downstream of the compressor along a refrigerant flowpath of the refrigerant in a cooling mode;
an expansion device (36);
a second heat exchanger (38) downstream of the expansion device along the refrigerant flowpath; and
a fan (42) for driving air along an air flowpath across the second heat exchanger for cooling the compartment in the cooling mode, further comprising:
a thermochemical refrigeration system (100) coupled to the vapor compression refrigeration system downstream of the first heat exchanger and upstream of the second heat exchanger along the refrigerant flowpath in the cooling mode, the thermochemical refrigeration system comprising:
a reactor (130);
an evaporator (120); and
a first valve (152) arranged along a thermochemical refrigerant flowpath (140) between the reactor and the evaporator;
a refrigerant-air heat exchanger (150) positioned along a single conduit extending between the reactor and the evaporator, to provide alternate flow in one of two directions depending on mode through the single conduit between the evaporator and the reactor so that the thermochemical refrigerant flowpath is a single bidirectional flowpath; and
a second valve (176) along the refrigerant flowpath and operable between:
a first condition where said refrigerant from the refrigerant flowpath passes through the evaporator; and
a second condition where said refrigerant from the refrigerant flowpath bypasses the evaporator.

12. The transport refrigeration system of claim 11 wherein:
the second valve (176) is located between the first heat exchanger (34) and the expansion device (36); and
a return line from the thermochemical refrigeration system is located between the second valve and the second heat exchanger (38).

13. The transport refrigeration system of claim 11 wherein:
the system is one of: a refrigerated trailer; a refrigerated truck cargo box; and a refrigerated shipping container.

14. The transport refrigeration system of claim 11 wherein:
the compartment is formed by a container having a door opening with at least one door.

15. The transport refrigeration system of claim 11 further comprising:
a heat source (220) for delivering heat to the reactor.

16. The transport refrigeration system of claim 15 wherein:
the heat source is an internal combustion engine.

17. The transport refrigeration system of claim 11 further comprising a controller configured to operate the transport refrigeration system in said cooling mode wherein:
refrigerant is compressed in the compressor and passed to the first heat exchanger;
the refrigerant is cooled in the first heat exchanger;
the refrigerant cooled by the first heat exchanger is further cooled by the thermochemical refrigeration system;
the refrigerant further cooled by the thermochemical refrigeration system is expanded by the expansion device; and
the expanded refrigerant is heated in the second heat exchanger and returned to the compressor.

18. The transport refrigeration system of claim 11 wherein:
the thermochemical refrigeration system comprises a thermochemical refrigerant comprising ammonia; and
the reactor comprises a vessel and a salt medium in the vessel.

19. The transport refrigeration system of claim 11 wherein:
in said first condition said refrigerant from the vapor compression system passes through the evaporator after passing through the first heat exchanger.

* * * * *